United States Patent [19]

Labes et al.

[11] Patent Number: 4,649,038

[45] Date of Patent: Mar. 10, 1987

[54] CYANOGEN POLYMERS AND PYROPOLYMERS AND FIBERS THEREOF

[75] Inventors: Mortimer M. Labes; Jiann H. Chen, both of Philadelphia, Pa.

[73] Assignee: Temple University, Philadelphia, Pa.

[21] Appl. No.: 775,601

[22] Filed: Sep. 17, 1985

Related U.S. Application Data

[63] Continuation-in-part of Ser. No. 656,950, Oct. 10, 1984, abandoned, and a continuation-in-part of Ser. No. 710,094, Mar. 11, 1985, abandoned.

[51] Int. Cl.[4] .................... C01B 21/06; C25B 1/00; D01F 9/12; B28B 11/18
[52] U.S. Cl. .................................... 423/364; 204/63; 264/29.2; 264/165
[58] Field of Search ............... 204/59 R, 63, 101; 264/29.2, 165; 428/357; 528/422; 423/364

[56] References Cited

U.S. PATENT DOCUMENTS

| 1,214,770 | 2/1917 | Foersterling et al. | 204/63 |
| 2,708,617 | 5/1955 | Magat et al. | 528/422 |
| 3,535,076 | 10/1970 | Fahnenstich et al. | 423/364 |
| 4,113,847 | 9/1978 | Fukushima | 264/29.2 |
| 4,460,708 | 7/1984 | Stuetz | 264/29.2 |

OTHER PUBLICATIONS

Andreades et al, J. Am. Chem. Soc., 91:15, 7-69, pp. 4181-4190.

Primary Examiner—Terryence Chapman
Attorney, Agent, or Firm—Ratner & Prestia

[57] ABSTRACT

A novel polycyanogen (MW at least 500) is made by electrochemical polymerization of cyanogen in solution. Fiber and pyrolyzed forms of this polymer and methods of making same are also described.

24 Claims, 3 Drawing Figures

CYANOGEN POLYMERS AND PYROPOLYMERS AND FIBERS THEREOF

This invention was made in the course of work under National Science Foundation grant No. DMR83-02329, and is subject to governmental rights based thereon, except to the extent such rights have been waived.

This application is a continuation-in-part of U.S. patent application Ser. Nos. 656,950, filed Oct. 10, 1984, and 710,094, filed Mar. 11, 1985, both of common inventorship and assignment herewith and both now abandoned.

FIELD OF THE INVENTION

This invention pertains to a novel polycyanogen, a conductive pyropolymer prepared therefrom, to fibers made therefrom and to the method of preparation of these polymers and fibers.

It has been predicted that a "paracyanogen" such as structure I would be metallic based on band structure calculations. (Whangbo, M. H.; Hoffman, R.; Woodward, R. B. Proc. Roy. Soc. Lond. A. 1976, 366, 23.

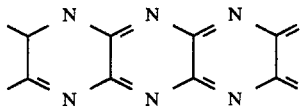

I

A low molecular weight oligomer (Structure II below) has been suggested to be the product of the anionic polymerization of cyanogen (IUPAC nomenclature: ethanedinitrile) in tetrahydrofuran using butyllithium as a catalyst. This "product" was reported to have a molecular weight of 180–496.

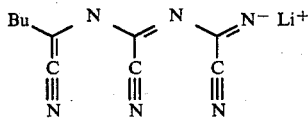

II (Peske, J; Benes, M. J.; Wichterle, O. Collection Czech. Chem. Commun. 1966, 31, 243).

However, further work (Skarda, V.; Ivkovich, D.; Labes, M. M. J. Polymer Sci. Vol. 23, 107–117 (1985)) has indicated that the trans-structural analog of II is the more likely product of the process disclosed in the Peska et al publication. Therefore, thermolysis of the anionic polymerization product leads to a highly cross-linked structure rather than the paracyanogen of structure I, as might have been theoretically predicted. Further, such a structure is not even the major product of solution anionic polymerization. The major product of solution anionic polymerization, according to Skarda et al., is a heterocyclic anion (BuC$_6$N$_6^-$) which then yields an open structured dimeric product.

A paracyanogen product was first suggested in 1816, when Gay Lussac noted the nitrogen-containing carbonaceous deposit upon heating mercuric cyanide (Gay Lussac, Ann. 1816, 53, 139). A summary of early literature on forming the material and its chemical properties can be found in the work of Bircumshaw et al (Bircumshaw, L. L.; Tayler, F. M.; Whiffen, D. H. J. Chem. Soc. 1954, 931) who prepared it from oxamide decomposition. Photopolymerization of cyanogen has been reported to occur, (Norrish, R. G. W.; Smith, F. F. P. Trans. Faraday Soc. 1928, 24, 620 and Hogness, T. R.; Ts'ai, L. J. Am. Chem. Soc. 1932, 54, 123) and Fabian succeeded in making thin films by uv polymerization of cyanogen vapor (Fabian, M. E. J. Mater. Sci. 1967, 2, 424). Reactive rf sputtering of carbon in nitrogen has resulted in "paracyanogen-like" films (Cuomo, J. J.; Leary, P. A.; Yu, D; Reuter, W.; Frisch, M. J. Vac. Sci. Technol. 1979, 16, 299). Brenner and Okamoto (Brenner, W.; Okamoto, Y. U.S. Nat'l. Tech. Inf. Service, Report #AD674766, 1968) prepared cyanogen from the reaction of potassium cyanide and phosphorus pentachloride and claimed the cyanogen so prepared polymerized spontaneously.

OBJECT OF THE INVENTION

It is an object of the present invention to provide a novel polymer and products and fibers made therefrom and to methods of making and treating this polymer and these products and fibers.

BRIEF DESCRIPTION OF THE INVENTION

The present invention comprises a polycyanogen comprised of

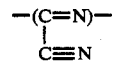

units and having a molecular weight of at least 500 and characteristic IR absorption peaks at 2220–2240 cm$^{-1}$ and 1500–1600 cm$^{-1}$ AND C13 NMR absorption peaks at 112–117 and 157–161 PPM; and a pyropolymer prepared from that polycanogen by thermolysis, the pyropolymer having a carbon-nitrogen ratio above 1.2, preferably at least 5, a room temperature conductivity of greater than 10$^{-1}$ (preferably above 1) ohm$^{-1}$ cm$^{-1}$ and an activation energy for conduction of less than 0.03 eV (preferably less than 0.003 eV). The present invention also includes an electrochemical method of making this polycanogen and methods of making fiber products and pyropolymers derived therefrom.

The fiber product as drawn from a solution of the polycyanogen has good tensile strength. In pyrolyzed form, the fiber product is electrically conductive.

DETAILED DESCRIPTION OF THE INVENTION

Figure 1:
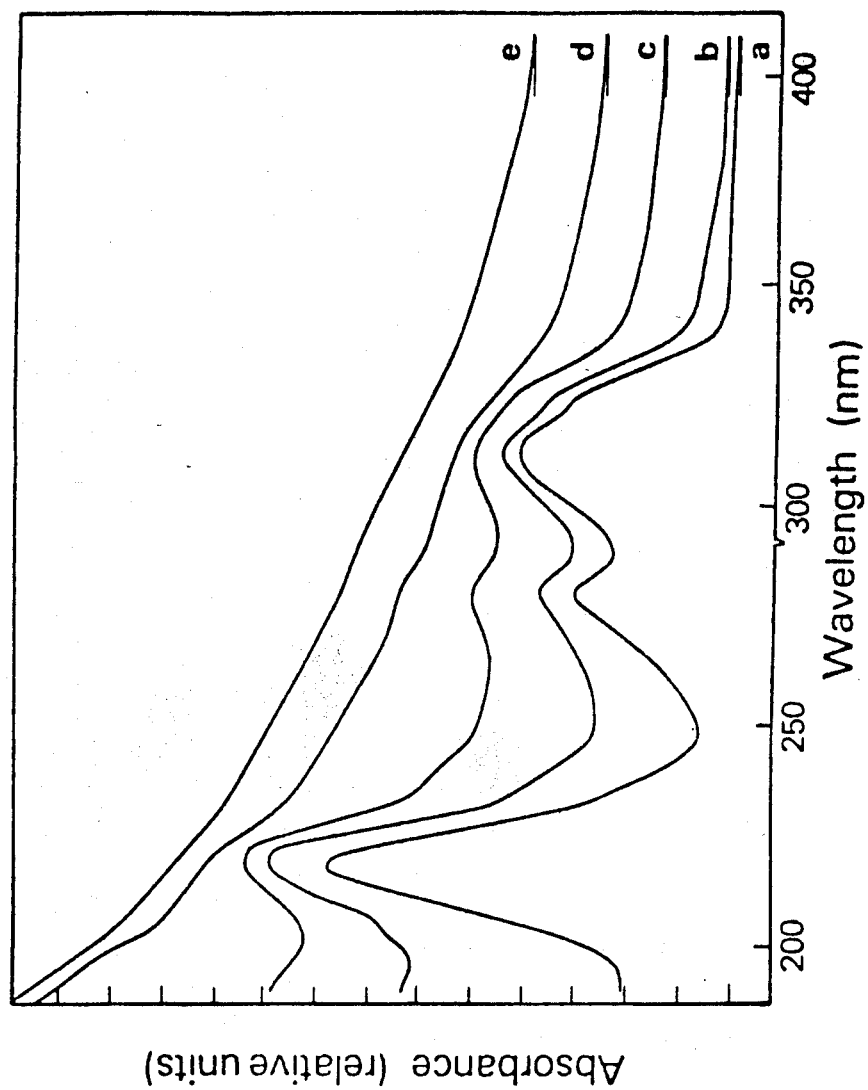
FIG. 1 is a plot of the UV-visible absorption spectra of the products of electro-polymerization of 1.2M cyanogen in acetonitrile containing 0.1M Et$_4$NBF$_4$ at 25° C. Curve (a) is the reference spectrum of C$_7$N$_7^-$ in acetonitrile; curves (b) (c) and (d) are the same spectrum at three minutes, five hours, and 24 hours respectively, after the electrochemical reaction is started; curve (e) is the spectrum of solid polymer scraped from the electrode and dissolved in acetonitrile.

According to one synthetic process of the present invention, $C_2N_2$ (cyanogen or ethane dinitrile, 1–1.5 moles/l) in an electrolyte solution comprising, in addition to $C_2N_2$, acetonitrile or any other appropriate polar organic solvent, and any appropriately soluble and stable electrolyte, such as tetraethylammonium tetrafluoborate ($Et_4NBF_4$) and tetramethylammonium tetrafluoborate ($Me_4NBF_4$), electrolyte concentration about 0.1 mole/l is placed in an electrolytic cell containing two glassy carbon electrodes. Polymerization is initiated electrochemically, typically at a voltage of approximately 5–15 V with a current of 85 mA–0.3 mA. During reaction, a black polymer deposit is formed on the anode.

This polymer deposit is recovered and purified by precipitation from tetrahydrofuran with petroleum ether to increase the average moelcular weight of the polymer, as purified, to above 500. Following purification, the polymer may be pyrolyzed by placing it in evacuated sealed quartz tubes and heating to the desired temperature.

The initial polymeric product of the solution electropolymerization is a highly electrostatic solid with a conductivity of $10^{-11}$ to $10^{-12}$ ohm$^{-1}$cm$^{-1}$. Based on IR and C13 NMR spectra, the polymer appears to be an open structured dimer of $C_7N_7^-$ to which

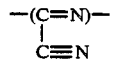

units have been added. As polymerization process, $(C_7N_7)^-$ diminishes (FIG. 1), and $C_2N_2$ links to the open structured dimer formed from the $(C_7N_7)^-$ leaving a polymer structure comprised of

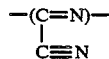

units. This is indicated by the IR absorption peak at about 2236 cm$^{-1}$ (FIG. 2, characteristic of the nitrile bond), the IR absorption peak at about 1550 cm$^{-1}$ (FIG. 2, characteristic of the —C=N— bond) and $C_{13}$ NMR peaks at 112-117 ppm and 155-161 ppm (in deuterated DMSO) characteristic of C≡N and —C=N—, respectively. After pyrolysis of this precursor the pyropolymer lacks the —C≡N band in its infrared spectrum (FIG. 2) and is an insoluble conducting solid, which is thermally stable to temperatures greater than 1500° C.

Similar results, though with somewhat more $C_7N_7^-$ in the resulting chain and lower molecular weight, have been obtained in an electrochemical cell, with the tetraalkylammonium salt of $C_7N_7^-$ as the electrolyte.

Selection of electrode material for the electropolymerization reaction appears to be crucial. Noble metals such as gold are attacked during the electrolysis and form complexes with cyanide ligands. Pyrolytic graphite is also unacceptable. The vitreous carbon electrodes employed are, however, completely inert within the reaction system. Other electrodes such as platinum or tungsten may also be employed.

Following is a specific example of the synthetic method of the present invention:

Acetonitrile (UV grade) was distilled over calcium hydride in an inert atmosphere and stored under high purity nitrogen. Reagent grade tetrahydrofuran was refluxed over potassium hydroxide for twenty-four hours, distilled over sodium in an inert atmosphere, and stored under high purity nitrogen. Electrolytes $Et_4NBF_4$ and $Me_4NBF_4$ were obtained as purissimum grade. Cyanogen gas (5 ppm $O_2$, 23 ppm $N_2$ and 50 ppm $H_2O$) was purified by a scrubbing train consisting of a silver nitrate bubbler, a calcium chloride tower, a sodium hydroxide tower and a phosphorus pentoxide tower.

A cylindrical reaction cell with side arms for filling and withdrawing materials was employed. The total volume of the cell was approximately 70 ml. All ports in the cell were furnished with stop cocks with ground joints. Teflon sleeves and plugs were used throughout. Two vitreous carbon electrodes, 2.5 cm in diameter, were placed at a distance of 1.0 cm. Both cell and electrodes were dried under nitrogen and flamed before polymerization. The entire cell was immersed in a methanol bath and a refrigerating unit was used to maintain the temperature of the system. Power was supplied using a constant voltage DC power supply.

$C_2N_2$ concentration was approximately 1.23 mole/l and the electrolyte concentration was approximately 0.1 mole/l. The voltage applied to the electrodes was held at 7–8 v and the current varied from 40 mA to 1 mA. Samples were removed periodically during the course of the polymerization in order to determine $C_7N_7^-$ content by spectroscopy. The polymer deposit formed on the anode was dried and scraped off under an inert atmosphere of high purity nitrogen inside a glove box. This polymer was then purified by precipitation from tetrahydrofuran with petroleum ether.

The purified polymer was placed in evacuated sealed quartz tubes and heated in stages up to 900° C. to produce a pyropolymer.

The crude polymer and pyropolymer were characterized by elemental analyses, molecular weight measurement, infrared, uv-visible and NMR spectroscopy, mass spectroscopic analysis, heat treatment in vacuo in sealed tubes, thermal analyses, and conductivity measurements.

For polymerization times of 24–72 hours, typical yields were approximately 30%–45%.

The electropolymerization of cyanogen was conducted both at room temperature and at −25° C. in single and double chambered cells. As indicated in Table I, vitreous carbon electrodes inserted into the acetonitrile solution in the presence of tetra-alkylammonium salts allowed the polymerization reaction to proceed and a black polymeric product to form at the anode. The highest molecular weights achieved for the anodic polymer were seen at room temperature. Molecular weights from 300 to 5,000 were achieved. Fractionation of the polymeric product via precipitation from THF with petroleum ether raised the molecular weight of a particular sample from 2,300 to 4,000.

Other solvents, electrolytes, and electrodes can also be used in the preparation of polycyanogen. Indeed the major requirements are (1) a polar organic solvent in which electrolytes may dissolve, (2) a salt whose redox does not occur at lower potentials than $C_2N_2$ and is sufficiently soluble in the organic solvent and (3) a non-reactive electrode. Typical electrolyte forming salts include one or members of the group $R_4NBF_4$ where R is selected from the group of $C_1$–$C_{10}$ alkyls. $C_7N_7^-$ anions may also be used.

Table IA summarizes materials that have been used in our experimentation to date and is a representative, but not an exhaustive list. Au, $SnO_2$, Pt, and Ag electrodes have also been employed, but polymers could be formed under these conditions only with some contamination from electrode reaction products.

The anodic polymer was subjected to elemental analysis and average molecular weight determinations were made by vapor pressure osmometry (Galbraith Laboratories, Inc.). As seen in Table II, the polymer consistently showed some oxygen content even though great care was taken to exclude $O_2$ and $H_2O$ from all solutions and manipulations of the polymers. In all of the analyses depicted in Table II, it was difficult to achieve complete combustion. Carbon-nitrogen residues were left accounting for 0–8% of the sample. Samples were carefully checked for the presence of trace elements but had little or no trace amounts of F or B present.

Table III illustrates the conductivity of the pyropolymers derived from electropolymerized cyanogen. The initial polymer is a highly electrostatic solid while the pyropolymers are conductive. Mass spectroscopic investigations have indicated that nitrogen gas is eliminated during the heating process starting at 300° C. to 700° C. Measurements of the temperature dependents of the 700° pyropolymer indicates an activation energy of approximately 0.03 eV from 25°–100° C. Table III also contains data on the pyrolysis of a "paracyanogen" prepared via the conventional method of oxamide decomposition taught by Bircumshaw, L. L.; et al (supra); this material does not form a conducting pyropolymer when heated to 600° C.

As depicted in FIG. 1, the characteristic absorption bands associated with the $C_7N_7^-$ anion disappear as the electropolymerization action proceeds.

Figure 2:
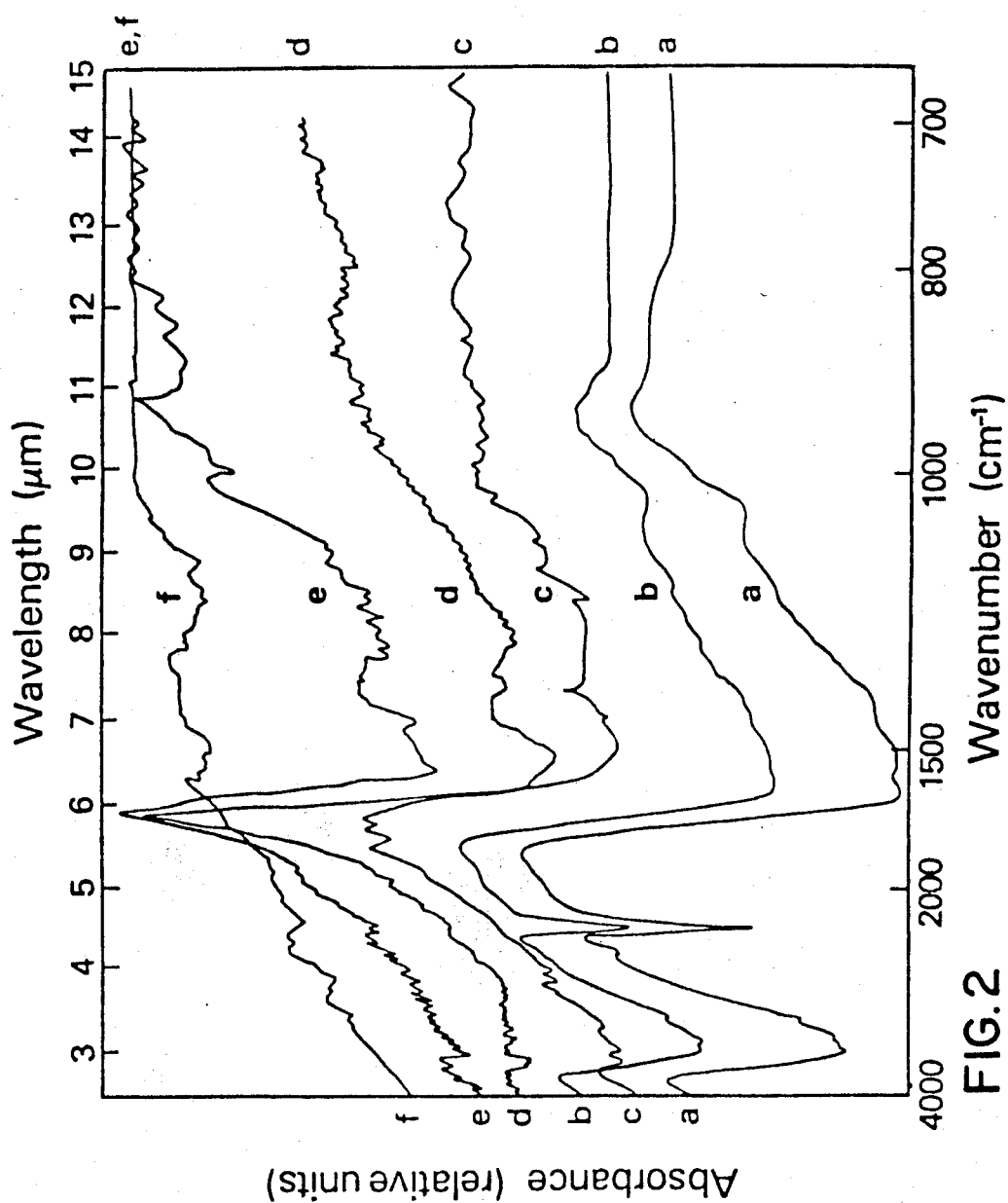
FIG. 2 is a plot of the infrared spectra of poly(cyanogen), produced in accordance with the present invention and its pyrolysis products. Specifically, curves (a)–(f) are the infrared spectra in KBr discs of:
 (a) crude electropolymerization product;
 (b) high molecular weight fraction produced by precipitation from THF with petroleum ether;
 (c) 400° pyropolymer;
 (d) 500° pyropolymer;
 (e) 600° pyropolymer;
 (f) 700° pyropolymer.

The effects of pyrolysis on the structure of the polymer can be discerned from the IR spectra of FIG. 2. Crude polymer (a) and those polymers subjected to lower temperatures in pyrolysis show a strong $C\equiv N$ band in the infrared spectrum. However, the 700° C. pyropolymer (f) shows almost no contribution from the $C\equiv N$ band.

Thermal analysis of the crude polymer and its pyropolymers confirms the thermal stability of the pyropolymers. The pyropolymers are essentially "doped" carbons with a CN ratio of approximately 5:1 when prepared between 700° and 800° C.

In order to draw the polymeric composition of this invention into a fiber, it is dissolved in tetrahydrofuran, concentrated to a viscous state by solvent evaporation and then drawn into fibers, typically 3–5 inches long with some as much as 2 feet long. These fibers have diameters on the order of 50 microns—200 microns and good uniformity.

By way of example, the average molecular weight of the polycyanogen subjected to drawing, in one instance, was about 5,000 (with a degree of polymerization of about 100). Fibers of reasonable strength have been drawn with molecular weights as low as 500. Polymers of molecular weight less than 500 do not appear to be of much practical value.

These fibers, drawn by pulling from the solution with a pipette or rod in an inert atmosphere, are optically uniaxial, indicating orientation of the polymeric rods along the pull direction of the fiber. Electron microscopy indicates that they are relatively dense and hole-free. Upon heating in a vacuum to temperatures on the order of 700° to 1,500° C. for two to three days, the polymeric fiber product retains its fiber form and becomes hard, shiny, flexible and strong. Optically, this pyrolyzed product appears amorphous and highly reflective, with a high conductivity, typical of commercial carbon fibers produced by other routes.

Since this processing procedure is simple and the processing temperature is very low compared to conventional production of carbon fibers, there seems to be considerable promise of useful application.

Again by way of example, a polycyanogen of approximately 5,000 molecular weight was prepared in a single chambered argon purged electrochemical cell with a concentration of 1.2 molar $(CN)_2$ in acetonitrile containing 0.1M tetraethylammonium tetrafluoborate. This solution was subjected to an electrolytic potential of 9 volts dc and an intial current of 60 ma for 48 hours using glassy carbon electrodes. Polymer formed at the anode flaked off into the cell with a yield of polycyanogen of about 45%. A small amount of oxidation was encountered and the carbon-to-nitrogen ratio in the polymer was about 1.2. However, C13 NMR spectroscopic evidence indicated no significant incorporation of the acetronitrile solvent into the polymer. Elemental analysis indicated, in the polycyanogen, a carbon content of 49.2%, nitrogen content 44.8%, hydrogen content 2.8% and oxygen 1.5%, all by weight. A solution of this polycyanogen in tetrahydrofuran (THF) was prepared by stirring approximately 10% polymer into the THF overnight. Solvent was evaporated until polymer concentration reached about 35–40% by weight, to form a deep brown viscous solution. As generally described above, fibers were drawn from this solution by pulling a pipet slowly through an then out of the solution. This was done in an inert atmosphere of an argon purged glove box. Some fibers were 10 inches or more and most were in the 3–5 inch range. Typically diameters were on the order of from a few micrometers to 50 micrometers, all with relatively uniform cross section along the length of the fiber.

This simple fiber-forming procedure can obviously be improved by utilizing commercial "spinning" equipment in which fibers are formed by extruding or forcing the solution through a "spinneret" at controlled rates into the air or an inert atmosphere or a quenching solution. All such drawing and extruding processes are referred to collectively herein as "spinning." The pyrolyses techniques may also be improved by placing the formed fibers under tension as is done with current carbon fiber processing techniques.

The fibers, produced as described above, are flexible and show distinct uniaxiality when viewed between crossed polars on an optical microscope. Scanning electron microscopy revealed good uniformity of the fibers. By placing them in quartz tubes in vacuo or in ceramic tubes in an argon atmosphere, the fibers were heated to various temperatures. Throughout these tests, the fibers retained their morphology and strength.

Figure 3:
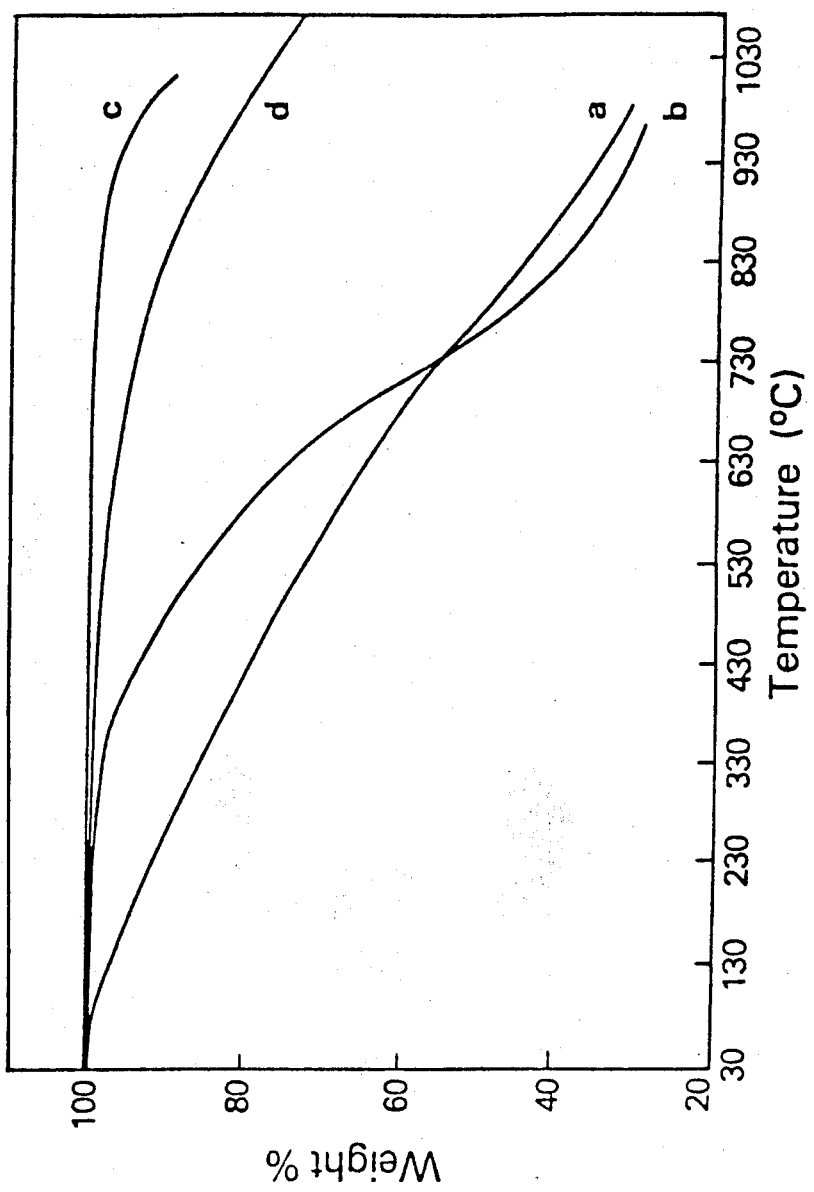
FIG. 3 is a plot of the thermogravimetric analysis of poly(cyanogen), produced in accordance with the present invention and its pyropolymers. The materials, heated in a nitrogen stream, comprise:
(a) crude polymerization product, scan rate 40°/minute;
(b) high molecular weight fraction of (a), scan rate 10°/minute;
(c) 700° pyropolymer, scan rate 20°/minute;
(d) 800° pyropolymer, scan rate 10°/minute.

Thermogravimetric analysis of the polycyanogen (PCN) fibers heated to 1000° C. was performed on a Perkin-Elmer TGS-2 (FIG. 3). (By comparison, Polyacrylonitrile (PAN) shows a weight loss of 60–67% under these circumstances; rayon shows a weight loss of 87–89% when carbonized to 1,000° C.) The C-N ratio at 700° was 5:1 and at 900° was 10:1. At higher pyrolysis temperatures, the C-N ratio goes up significantly as residual nitrogen decreases. By analogy to PAN, it is expected that at temperatures above 1500° C., the residual nitrogen will become negligible.

Table IV is a summary of electrical resistivity data. A standard four-probe dc technique was employed on carbon fibers mounted utilizing conducting silver paint. Temperature dependent resistivity measurements were performed between 77K and 298K by inserting the sample block in a liquid nitrogen Dewar flask.

The low resistivities indicate that some degree of graphitization had begun at temperatures below 1,500° C. For PAN and other carbon fiber precursor such as pitch or benzene, typical resistivities of commercial fibers are in the range $10^{-5}$ to $0.8 \times 10^{-6}$ ohms-meters. Because of the simplicity employed in the heat treatment procedure for the Polycyanogen of this invention, and the achievement of considerable conductivity at temperatures as low as 700°, this new route to carbon fibers seems attractive.

As a further demonstration of the significant physical characteristics of the polycanogen (PCN) of the present invention, various samples of this PCN have been tested for tensile strength. The results of this test for six samples, varying in molecular weight from 400 to 4965 are shown in Table V. These results confirm that polymers of molecular weight below 500 are of little practical value while higher molecular weight PCN exhibits good polymeric properties.

While this invention has been described with respect to specific embodiments thereof, it is not limited thereto. The appended claims therefore are intended to be construed to encompass not only those forms of the invention disclosed herein but to such other forms and variants as may be made by those skilled in the art without departing from the true spirit and scope of the invention.

TABLE I

| Cell Compartments | Electrolyte 0.1 M | Temp. °C. | Voltage dc | Current (ma) Initial | Current (ma) Final | Polymer Avg. M.W. |
|---|---|---|---|---|---|---|
| Single | — | 25 | 8 | .07 | .07 | none |
| Single | Et$_4$NBF$_4$ | 25 | 8 | 25 | 1.4 | 2300 |
| Double | Et$_4$NBF$_4$ | −25 | 7 | 2 | 1 | 625 |
| Single | Et$_4$NBF$_4$ | −25 | 10 | 3 | 2 | 700 |
| Double | Et$_4$NBF$_4$ | −25 | 7 | 2 | 1 | 300 |
| Single | Et$_4$NBF$_4$ | 25 | 9 | 69.2 | 1.5 | 4965 |

TABLE IA

Electrolytes, Solvents, and Electrodes Utilized in Preparation of Polycyanogen

| | |
|---|---|
| electrolyte | Et$_4$NBF$_4$, Me$_4$NBF$_4$, (Me)$_4$NPF$_6$, KCN, Et$_4$NCN, AgCN, NaC$_7$N$_7$, Et$_4$N(C$_7$N$_7$), Me$_4$N(C$_7$N$_7$) |
| solvent | CH$_2$Cl$_2$, THF, CH$_3$CN, DMF, pyridine |
| electrode | Pt, glassy carbon, Au, Ag, SnO$_2$ |

TABLE II

Analytical Data on Poly(cyanogen) Prepared via Electropolymerization at 25° in Acetonitrile-Et$_4$NBF$_4$

| Sample | C/N | % O |
|---|---|---|
| 1 | 1.26 | 11.8 |
| 2 | 1.34 | 6.7 |
| 3 | 1.26 | 7.2 |
| 4[a] | 1.33 | 9.9 |
| 5 | 1.34 | 5.3 |
| 6 | 1.33 | 3.8 |
| 7 | 1.35 | 6.5 |
| 8[b] | 1.28 | 1.5 |

[a]The complete elemental analysis of sample 4, typical of those in which complete combustion was attained is as follows: % C 46.37, % N 40.60, % H 2.72, % O 9.87.
[b]After the crude product is extracted with acetonitrile in a Soxhlet extractor.

TABLE III

Room Temperature DC Conductivity of Compacted Discs of Pyropolymers Derived from Electropolymerized Poly(cyanogen)

| Pyrolysis Temp. | C/N | Oxygen % | Conductivity $\Omega^{-1}$ cm$^{-1}$ |
|---|---|---|---|
| 400 | 1.50 | 8.4 | $8 \times 10^{-9}$ |
| 500 | 1.57 | 7.1 | $1 \times 10^{-7}$ |
| 500 | 1.67 | 2.0 | $4 \times 10^{-5}$ |
| 600 | 1.87 | 1.3 | $6 \times 10^{-3}$ |
| 600 | 2.20 | 0.7 | $8 \times 10^{-4}$ |
| 700 | 4.16 | 1.3 | $5 \times 10^{-1}$ |
| 700 | 5.00 | 0.9 | 1.1 |
| 800 | 5.20 | 1.0 | 1.3 |
| 900 | 9.31 | <.3 | 21.0 |
| 600[a] | 1.25 | 5.7 | $7 \times 10^{-9}$ |

[a]These data are obtained on a sample of a "paracyanogen" prepared by heating oxamide until it decomposes, and subsequent heating to 600° as taught by Bircumshaw et al in the publication referenced above.

TABLE IV

Carbon Fibers From Poly(cyanogen)

| Heat Treatment Temp. (HTT) °C. | Time At HTT Hrs. | Resistivity at 300K R$_{300}$ $\Omega$m × 10$^5$ | Resistivity Ratio R$_{77}$/R$_{300}$ | Ea[a] ev |
|---|---|---|---|---|
| 700 | 12 | 1000 | 10.0 | .02 |
| 700 | 36 | 9 | 2.1 | .007 |
| 900 | 12 | 8 | 1.4 | .003 |
| 900 | 12 | 7 | 1.2 | .002 |
| 1000 | 36 | 3.1 | 1.20 | .002 |
| 1000 | 36 | 2.5 | 1.16 | .001 |
| 1500 | 4 | 1.7 | 1.07 | .0007 |
| 1500 | 4 | 1.7 | 1.04 | <.0004 |

[a]from $R = R_o \exp(E_a/kT)$
Ea = activation energy for resistivity

TABLE V

Evaluation of Tensile Strength of PCN

| Molecular Weight | Tensile Strength KPSi |
|---|---|
| 400 | too fragile to test |
| 901 | 2.3–7.3 |
| 1008 | 5.5 |
| 1712 | 9.1–20.2 |
| 1874 | 3.6–7.2 |
| 4965 | 6.4–10.2 |

Conclusions: Little variation between average tensile strengths of materials from 900–5000 M.W. Tensile strength decreases below M.W. 900 very quickly.

We claim:
1. A method for electrochemically synthesizing a poly(cyanogen) comprising the steps of:
   (1) preparing a solution of C$_2$N$_2$ and a soluble stable electrolyte in a polar organic solvent;
   (2) passing an electric current through said solution between an inert cathode and an inert anode, said current adapted to initiate polymerization in said solution and to deposit poly(cyanogen) on said anode.

2. A method, as recited in claim 1, wherein said anodic deposit is purified by solvent precipitation.

3. A method, as recited in claim 2, wherein a high molecular weight fraction of said deposit is precipitated from a solution of said deposit in tetrahydrofuran by adding petroleum ether.

4. The method of claim 1 wherein said electrolyte is $R_4NBF_4$ where R is selected from the group of $C_1$–$C_{10}$ alkyls.

5. The method of claim 4 wherein said electrolyte is a mixture of at least two different salts.

6. The method of claim 4 wherein said solvent is acetonitrile.

7. The method of claim 1 further including the step of:

(3) pyrolyzing said anodic deposit at a temperature above 400° C. for a time sufficient to produce a pyropolymer characterized by a carbon-nitrogen ratio above 1.2, a room temperature conductivity of greater than $10^{-1}$ ohm$^{-1}$ cm$^{-1}$, and an activation energy for conduction of less than 0.03 ev.

8. A polycyanogen fiber spun from a polycyanogen comprised of

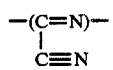

units.

9. A polycyanogen fiber as recited in claim 8, which has been pyrolyzed and which has a carbon-to-nitrogen ratio above 1.2.

10. A polycyanogen fiber as recited in claim 8, which has been pyrolyzed and which has a carbon-to-nitrogen ratio above 5:1.

11. A polycyanogen fiber as recited in claim 8, which has been pyrolyzed and which has a carbon-to-nitrogen ratio of 10:1.

12. A polycyanogen fiber as recited in claim 8, which has been pyrolyzed and which has a carbon-to-nitrogen ratio above 10:1.

13. A polycyanogen fiber as recited in claim 8, which has been pyrolyzed and which has a resistivity of less than $9 \times 10^{-5}$ ohms meter.

14. Method of making a polycyanogen fiber comprising:

(a) preparing a solution of $C_2N_2$ in a soluble stable electrolyte in a polar organic solvent;

(b) passing an electric current through said solution between an inert cathode and an inert anode, said current adapted to initiate polymerization in said solution;

(c) allowing poly(cyanogen) formed thereby to deposit on said anode;

(d) forming a concentrated solution of said poly(cyanogen) in an organic solvent therefor;

(e) and spinning a fiber of said polycyanogen from said solution.

15. A method of forming a pyrolyzed polycyanogen fiber comprising forming a polycyanogen fiber, as recited in claim 14 and heating said fiber in an inert atmosphere or in vacuo to a temperature above 700° C.

16. A method of forming a pyrolyzed polycyanogen, as recited in claim 15 wherein said polycyanogen fiber is heated to a temperature above 1,000° C.

17. A method of forming a pyrolyzed polycyanogen, as recited in claim 15 wherein said polycyanogen fiber is heated to a temperature above 1,500° C.

18. A method of forming a pyrolyzed polycyanogen, as recited in claim 15 wherein in step (d) of claim 14 said polycyanogen is dissolved in tetrahydrofuran.

19. A polymer of cyanogen comprised of

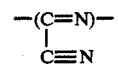

units, having a molecular weight of at least 500, IR absorption peaks at 2220–2240 cm$^{-1}$ and 1500–1600 cm$^{-1}$ and C13 NMR peaks at 112–117 and 157–161 PPM in deuterated DMSO.

20. A polymer as recited in claim 19 wherein said molecular weight is at least 1000.

21. A product formed by pyrolysis of a polymer as recited in claim 19.

22. A product as recited in claim 21 having a conductivity of greater than $10^{-1}$ ohms$^{-1}$ cm$^{-1}$.

23. A product as recited in claim 21 having a conductivity greater than 1 ohm$^{-1}$ cm$^{-1}$.

24. A polymer as recited in claim 21 having an activation energy for conduction of less than 0/03 eV.

* * * * *